US005474821A

United States Patent [19]

Kass

[11] Patent Number: 5,474,821

[45] Date of Patent: Dec. 12, 1995

[54] FUSING MEMBER FOR ELECTROSTATOGRAPHIC REPRODUCING APPARATUS AND METHOD FOR PREPARING FUSING MEMBERS

[75] Inventor: Allen Kass, Pittsford, N.Y.

[73] Assignee: Eastman Kodak Company, Rochester, N.Y.

[21] Appl. No.: 140,644

[22] Filed: Oct. 21, 1993

[51] Int. Cl.[6] .................... B32B 7/00; B05D 3/00

[52] U.S. Cl. .................... 428/35.8; 428/35.9; 428/36.8; 428/36.9; 428/447; 428/448; 428/450; 428/472.2; 492/53; 492/56; 427/327; 427/372.2; 427/379; 427/387; 427/388.1; 264/236; 264/241; 264/347; 264/331.11

[58] Field of Search .................... 428/35.8, 35.9, 428/36.8, 36.9, 447, 450, 469, 472.2, 472.3, 448; 492/56, 53; 528/31, 22, 489, 528, 532, 307, 327, 372.2, 379, 387, 388.1, 402; 264/236, 237, 241, 259, 319, 347, 331.11; 156/273.3, 273.5, 275.5

[56] References Cited

U.S. PATENT DOCUMENTS

| | | | |
|---|---|---|---|
| 3,382,249 | 5/1968 | Heinzelman, Jr. . | |
| 3,400,021 | 9/1968 | Heinzelman, Jr. . | |
| 3,985,584 | 10/1976 | Chan et al. | 148/6.16 |
| 3,987,530 | 10/1976 | Atkin et al. | 29/132 |
| 4,147,832 | 4/1979 | Namiki | 428/375 |
| 4,196,256 | 4/1980 | Eddy et al. | 428/422 |
| 4,227,946 | 10/1980 | Williamson | 148/6.16 |
| 4,702,964 | 10/1987 | Hirano et al. | 428/447 |
| 4,711,818 | 12/1987 | Henry | 428/421 |
| 4,807,341 | 2/1989 | Nielsen et al. | 492/56 |
| 4,822,631 | 4/1989 | Beaudet | 427/14.1 |
| 5,053,081 | 10/1991 | Jacob | 106/287.11 |
| 5,153,660 | 10/1992 | Goto | 355/285 |
| 5,158,622 | 10/1992 | Reichgott et al. | 148/247 |

OTHER PUBLICATIONS

Research Disclosure, Jan. 1991, Item 32119.

Research Disclosure, Jan. 1991, Item 321118, by Industrial Opportunities, Ltd., Homewell Havant, Hampshire, UK.

*Surface Analysis and Pretreatment of Plastics and Metals,* Ed. D. M. Brewis, MacMillan Publ. Co., Inc., (1982) pp. 175–197.

*Metals Handbook,* 9th Edition, ASM ed., vol. 5, pp. 597–601.

*Metal Finishing Guidebook Directory,* 1977, (p. 464) pp. 457–472.

*Adhesive Bonding Alcoa Aluminum,* Aluminum Company of America, Chapter 2 "Surface Preparation", pp. 33–38.

*Primary Examiner*—Patrick J. Ryan
*Assistant Examiner*—Marie R. Yamnitzky
*Attorney, Agent, or Firm*—Anne B. Kiernan; Robert Luke Walker

[57] ABSTRACT

A fusing member and a method for preparing such a fusing member are disclosed. The method has the steps of conversion coating a support member; applying a base cushion of thermally insulating silicone elastomer over the conversion coating; vulcanizing the base cushion; and baking the support member and the base cushion at a temperature in excess of the temperature necessary to vulcanize the base cushion in less than 5 minutes.

20 Claims, 1 Drawing Sheet

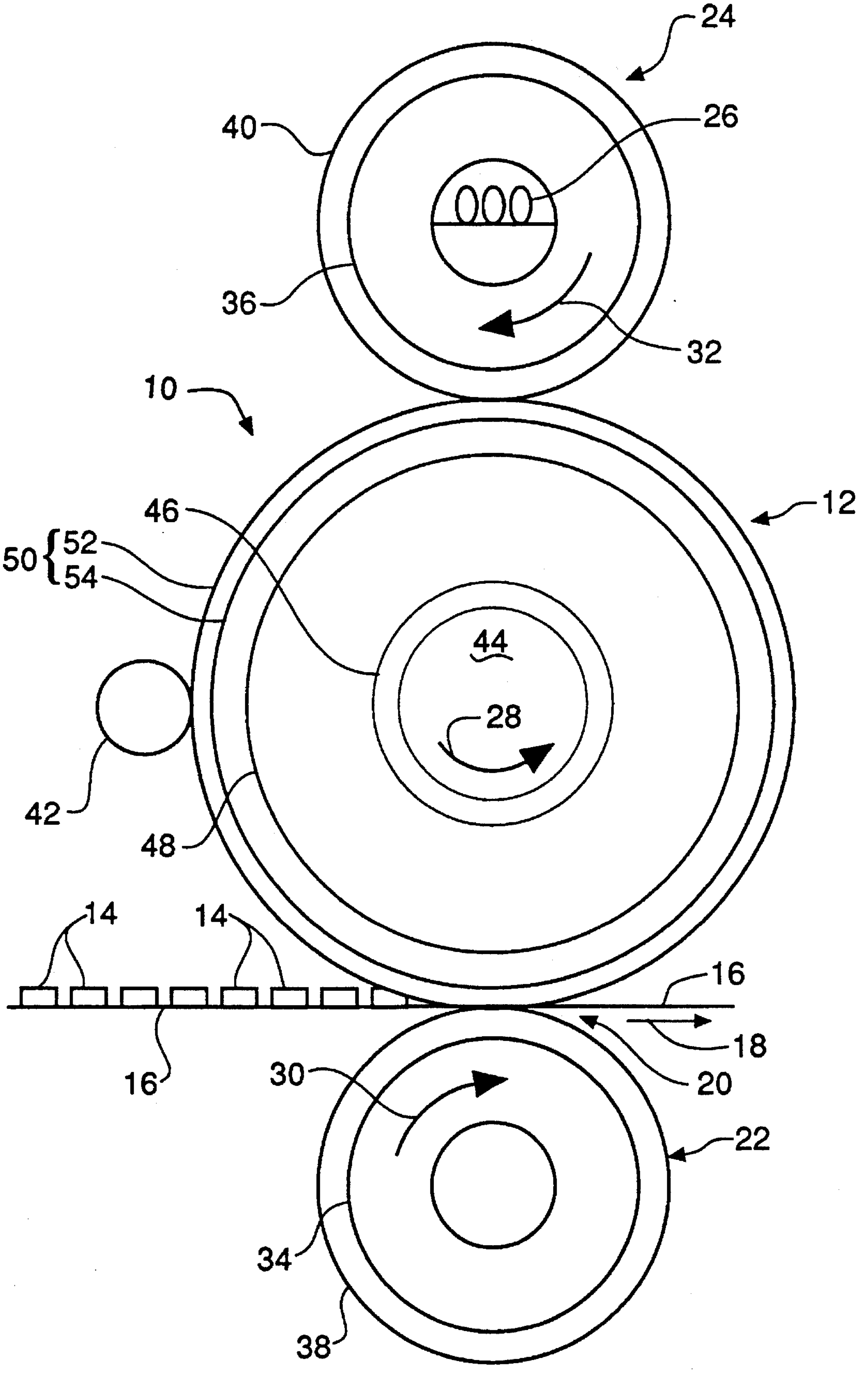
24
26
40
36
32
10
12
46
50
52
54
44
28
42
48
14
14
16
16
18
20
30
22
34
38

FUSING MEMBER FOR ELECTROSTATOGRAPHIC REPRODUCING APPARATUS AND METHOD FOR PREPARING FUSING MEMBERS

FIELD OF THE INVENTION

The invention relates to electrostatographic reproducing apparatus and methods. More particularly, the invention relates to a fusing member for electrostatographic reproducing apparatus and a method for preparing fusing members.

BACKGROUND OF THE INVENTION

In electrostatography, an image charge pattern, also referred to as an electrostatic latent image, is formed on an element and is then developed by treatment with an electrostatographic developer containing particles which are attracted to the charge patterns. These particles are called toner particles or, collectively, toner. The resulting toner image is then generally transferred to a receiver such as a sheet of paper and is fused, or fixed, to the receiver by the application of heat and pressure.

Toner consists primarily of a binder polymer. In order to fuse the toner image onto the support it is necessary to elevate the temperature of the toner above the Tg, the glass transition temperature, of the toner binder, at which point the toner becomes tacky and flows, to an extent, into the fibers or pores of the support member. As the toner cools, solidification of the toner causes the toner image to be firmly bonded to the support.

Several approaches to thermal fusing of toner images have been described in the art. These methods include providing the application of heat and pressure at substantially the same time by passage through a nip defined by a pair of opposed members, such as: a pair of rolls maintained in pressure contact; a flat or curved plate member in pressure contact with a roll; or a belt member in pressure contact with a roll. Heat may be applied by heating one or both of the members. Adequate fusing of the toner image calls for a proper combination of heat, pressure, and contact time. The balancing of these parameters for particular apparatus and process conditions is well known in the art.

Members of the fuser are commonly referred to as a "fusing member", a "fusing roll" or the like, and a "pressure member" or "pressure roll" or the like. The fusing member contacts the toner image, while the pressure member contacts the opposite surface of the receiver. Multiple members of each type are, of course, possible, as are fusers in which opposed fusing members simultaneously fuse toner images on both sides of a single receiver.

During fusing, it is important that toner particles not transfer from the toner image on the receiver to a fusing member. Toner particles offset onto the fusing member may deposit on a subsequent receiver resulting in a false or "offset" image or may contaminate the pressure member, or may eject onto other portions of the apparatus. The net result is a degradation of the copying cycle. What is commonly referred to as "hot offset" occurs when the temperature of toner is raised to a point where toner particles liquefy, and the toner image splits with a portion remaining on the fusing member. The temperature of hot offset is a measure of the release property of a fusing member.

The hot offset temperature of a fusing member may be increased by covering the surface of the fusing member with a low surface energy material such as a silicone elastomer or tetrafluoroethylene resin. Such materials have a further advantage in that contaminants, such as paper fibers and other debris, which would cause a reduction in hot offset temperature, do not readily adhere. Depending upon the resiliency and other characteristics of the low surface energy layer, a fuser member may also include a base cushion of resilient material between the support and the low surface energy layer. The different silicone elastomer layers generally adhere to each other reasonably well.

Release agents, such as silicone oil, are commonly used on fusing members to further insure complete release of the toner image. Silicone release agents can cause swelling of silicone elastomers. This is undesirable and can result in failure of the silicone elastomer. A number of remedial measures are known, for example, silicone fluoride elastomer is resistant to silicone oil.

A fuser roll of cured silicone molding compound is described in Research Disclosure, January 1991, Item 32119. It is indicated that the fuser roll can be fabricated by the process of liquid injection molding. The silicone molding compound is Silastic J, a two-part liquid silicone elastomer which is cross-linked via an addition reaction between vinyl and hydride functionalities, accelerated by a platinum catalyst. The fuser roll is described as being resistant to premature failure due to fluid (silicone oil) absorption.

It is common practice to internally heat at least one member of a pair of fusing members. There are advantages, however, such as decreased energy consumption and quicker warm-up, that can be provided by the less common practice of externally heating at least one fusing member. An externally heated fusing member is taught by Research Disclosure, January 1991, Item 321118, published by Industrial Opportunities Ltd., Homewell Havant, Hampshire, P09 1EF, UK, (this publication is hereafter referred to as Research Disclosure). With an internally heated fusing member, it is desirable to maintain the entire fusing member at a substantially uniform temperature, thus coatings are selected which dissipate heat well. With an externally heated fusing member, it is desirable to heat only the outer portions of the fusing member, since the core acts as a heat sink. It is thus desirable to provide a heat insulating layer over the core and a heat dissipating layer over the heat insulating layer. There is a thermal gradient in such a fusing member which has increased thermal stresses relative to an internally heated fusing member.

It is desirable to provide an improved fusing member and method for preparing an improved fusing member in which a heat insulating layer is bonded to a metallic support.

There has long been an interest in adhering materials to aluminum and a number of procedures have been developed for that purpose. In *Surface Analysis and Pretreatment of Plastics and Metals*, ed. D. M. Brewis, Macmillan Publ. Co., Inc., New York, chapter 8: "Surface Treatments for Aluminum", (1982); procedures are divided into classes: mechanical treatment, alkaline cleaning, chemical etching, and acid anodizing. U.S. Pat. Nos. 3,383,249; 3,400,021; 3,985,584; 4,227,946; 5,053,081; and 5,158,622 describe various chemical treatment procedures.

Chemical etching is commonly also referred to as chemical conversion coating and is defined in the *Metals Handbook*, 9th edition, ASM ed., Volume 5, "Surface Cleaning, Finishing, and Coating", ASM, Metals Park, Ohio, p. 597:

> "Chemical conversion coatings are adherent surface layers of low-solubility oxide, phosphate, or chromate compounds produced by the reaction of suitable reagents with the metallic surface."

Chromate conversion coating defines well known procedures commonly utilized to treat metals such as aluminum. Chromate conversion must be distinguished from chromic acid anodizing. The processes themselves utilize a chemical oxidation-reduction reaction, in the case of the conversion process and an electrochemical reaction, in the case of the anodization. The coatings produced are also very different:

"Chromic acid anodizing produces a thick, dense oxide which consists of solid columns approximately 400 nm in diameter with a smooth surface. This thick oxide improves the corrosion resistance but the lack of porosity reduces the possibility of mechanical interlocking and hence it might be expected that the initial strengths of adhesive bonds would be lower. This explanation was supported by a recent study which compared chromic acid etching and anodizing. The etched adherends gave higher initial bond strengths than those which had been anodized but the latter gave more durable bonds in a high humidity environment." *Surface Analysis and Pretreatment of Plastics and Metals*, cited above, p. 182–183. *Metals Handbook*, cited above, at p. 597 similarly states:

"Conversion coatings are used interchangeably with anodic coatings in organic finishing schedules. One use of conversion coating is as a spot treatment for the repair of damaged areas in anodic coatings. Conversion coatings should not be used on surfaces to which adhesives will be applied because of the low strength of the coating. Anodic coatings are stronger than conversion coatings for adhesive bonding applications."

U.S. Pat. No. 4,822,631 to Beaudet, teaches an imaging member (a member on which the latent electrostatic image is created and toned), which has an aluminum cylinder, smoothed and then anodized to produce an oxide surface. After anodizing, which is not described in any detail, the aluminum cylinder is rinsed in deionized water, baked, and then covered with a layer of silicon rubber or the like.

U.S. Pat. No. 4,196,256 teaches a fuser roll having a flame sprayed metal surface of steel, stainless steel, nickel, nickel/chromium, molybdenum or the like optionally covered with a primer containing chromic acid, phosphoric acid, tetrafluoroethylene and water and then covered with a fused powder coated copolymer of perfluoroalkyl perfluorovinyl ether and tetrafluoroethylene. A preferred metal for the flame sprayed layer is number 304 stainless steel wire.

Therefore, it would be desirable to utilize a chemical treatment to improve adhesion of a silicone layer to an aluminum support in order to provide an improved fusing member and method for preparing an improved fusing member.

SUMMARY OF THE INVENTION

Applicant had determined that silicone elastomer molding compound has heat insulating properties desirable for a heat insulating layer, but also has a propensity to delaminate from a metal support member or core. It is an advantageous effect of at least some of the embodiments of the invention that an improved fusing member and method for preparing an improved fusing member are provided in which the fusing member has a silicone elastomer molding compound layer that is resistant to delamination from a support member.

The invention, in its broader aspects, provides a fusing member and a method for preparing such a fusing member. The method comprises conversion coating a support member; applying a base cushion of thermally insulating silicone elastomer over the conversion coating; vulcanizing the base cushion; and baking the support member and the base cushion at a temperature in excess of the temperature necessary to vulcanize the base cushion in less than 5 minutes.

BRIEF DESCRIPTION OF THE DRAWINGS

The above-mentioned and other features and objects of this invention, and the manner of attaining them, will become more apparent, and the invention itself will be better understood by reference to the following description of an embodiment of the invention taken in conjunction with the accompanying FIGURE wherein:

The FIGURE is a semi-diagrammatical and partially cross-sectional side plan view of a fuser incorporating a fusing member of the invention.

DESCRIPTION OF PARTICULAR EMBODIMENTS

In the method for preparing a fusing member of the invention, an aluminum support member is conversion coated, covered with a base cushion of silicone elastomer molding compound, the base cushion is vulcanized, and the unfinished fusing member is baked at an elevated temperature. The completed fusing member exhibits improved resistance to separation of the base cushion from the fusing member, in comparison to an untreated support member, an anodized support member, and a fusing member in which the support member was conversion coated but not baked. This result is highly unexpected and surprising.

The support member is a fusing roller core or the equivalent structure of a plate-type or other type of fusing member. The support member is made of aluminum alloy. The method of the invention is expected to be generally applicable to aluminum alloys suitable for conversion coating. Selection of a suitable alloy is thus a matter of knowledge for one skilled in the art or simple experimentation or a combination thereof. *Metal Finishing Guidebook, Directory*, Michael Murphy editor, Metals Finishing Magazine, Hackensack, N.J., 1987, p. 464 describes the selection of aluminum alloys for conversion treatment:

"In general the non-heat treatable, low alloying constituent metals are easiest to treat and provide the maximum resistance to corrosion. Conversely, wrought aluminum which is high in alloying elements (especially silicon, copper or zinc), or which has undergone severe heat treatment, is more difficult to coat uniformly and is more susceptible to corrosive attack. High silicon casting alloys present similar problems. The effect of these metal differences, however, can be minimized by proper attention to the cleaning and pretreatment steps."

A currently preferred alloy is 6061-T6, which is heat treated and has the nominal composition (in parts by weight): 0.6 Si, 0.25 Cu, 1.0 Mg, 0.25 Cr, and Al to provide a total of 100 parts.

The aluminum alloy support member or core is conversion coated. The terms "conversion coating" and the like is used herein to refer to coatings which are adherent, thin, and relatively porous surface layers of low-solubility oxide, phosphate, or chromate compounds produced by the oxidation-reduction reaction of suitable reagents with the metallic surface. The conversion coating or conversion coating process is not limited to particular coatings or processes specifically identified as such, within the art or commercially;

but also includes equivalent processes, whatever their designation or trade name. This definition is exclusive of a variety of anodized coatings and acid anodizing processes which, as discussed above, produce relatively thick, smooth (that is non-porous) oxide layers.

Currently preferred are "conventional" chromate conversion processes, which utilize chromate and fluoride ions in an acidic solution. Convenient conversion solutions are, for example, chromate and chromate/phosphate solutions disclosed in *Metals Handbook*, Ninth Edition, Vol. 5, "Surface Cleaning, Finishing, and Coating", page 601. Another convenient conversion coating solution is marketed by Oakite Products, Inc., of Berkeley Heights, N.J. as Oakite Chromi-Coat L25™. Compositions of each of these solutions are described in the Examples.

Before the conversion coating is produced, the support member is cleaned to remove organic contaminants and oxide or corrosion products. The substantially uniform surface thus provided helps reduce nonuniformities in the conversion coating. The support member can be washed with an aluminum alkaline detergent. Suitable detergents are well known to those skilled in the art and provide a wetting and cleaning action with minimal pitting or other surface degradation.

The conversion coating can be produced, without anodizing, by any suitable method of wetting the support member with the conversion solution, for example, spraying, brushing, or wiping. A convenient method is dipping the support member into a tank of conversion solution.

After exposure to the conversion solution, the support member may be exposed to a "chrome treat solution" containing a reducing agent, such as sodium bisulfite, to reduce $Cr^{6+}$ to $Cr^{3+}$ for the purpose of reducing waste treatment.

After conversion coating, the support member may be stored or may be immediately covered with the base cushion layer. A primer is applied to the conversion coated surface prior to application of the base cushion layer. A metal alkoxide or sol-gel type primer is suitable, for example, Dow™ 1200 RTV Prime Coat primer, marketed by Dow Corning Corporation of Midland, Mich.; which contains light aliphatic petroleum naptha (85 weight percent), tetra (2-methoxyethoxy)-silane (5 weight percent), tetrapropyl orthosilicate (5 weight percent), and tetrabutyl titanate (5 weight percent).

A base cushion of thermally insulating, silicone oil resistant, silicone elastomer is applied over the primer coating on the support member and is then vulcanized. The low thermal conductivity of the base cushion enables it to damp cyclic variations in temperature of remaining system components and further limits the short term effects of the support member as a heat sink. In a preferred embodiment of the invention, the thickness of the base cushion is from 0.250 to 0.500 inches, or more preferably, 0.375 inches. Thicker or thinner dimensions may be used.

In a preferred embodiment of the invention, the base cushion is a silicone elastomer molding compound, that is, a silicone suitable for use as a mold. Such elastomers are characterized by low surface energy, relatively high tensile strength and tear strength and relatively low elongation. The preferred elastomer is a two-component, room temperature vulcanizing (RTV) silicone cured by catalyzed hydrosilation curing. The two-part liquid silicone elastomer is cross-linked via an addition reaction between vinyl and hydride functionalities, accelerated by a platinum catalyst. An example of such a silicone molding compound is Silastic™ J RTV room temperature vulcanizing silicone rubber.

Another silicone molding compound is Eccosil JT marketed by Grace Specialty Polymers of Canton, Mass. Table 1 lists various characteristics of these two elastomers.

TABLE 1

| | Silastic J RTV | Eccosil JT |
|---|---|---|
| Specific gravity | 1.28 | 1.25 |
| Shore A | 60 | 60–70 |
| Tensile strength | 750 psi at 150% elongation | 700 psi minimum at break |
| Elongation | 175% | 125% minimum |

The procedure for vulcanizing the base cushion is not critical. For example, the curing process for Silastic J is described by product literature as follows:

"The cure of SILASTIC J RTV silicone rubber occurs by a reaction between the base polymer and the curing agent. This polymerization requires 24 hours after the addition of the curing agent at room temperature. This material will not revert or depolymerize, even under conditions of elevated temperature and confinement. Vulcanization can be accelerated by heating the catalyzed material. However, this will increase the shrinkage from nil to 0.3 percent. A part ¼-inch thick will set up within 30 minutes if the temperature is maintained at 65° C. (150° F.). The rate at which thicker sections will set up depends on the size and shape of the piece.

"Vulcanization will not be accelerated at the center of the piece until the entire mass has reached the elevated temperature. Average set-up times at various temperatures for ¼-inch moldings are shown below:

| Temperature | Set-Up Time |
|---|---|
| 25 C. (77 F.) | <24 hrs. |
| 52 C. (125 F.) | 60 min. |
| 65 C. (150 F.) | 30 min. |
| 93 C. (200 F.) | 15 min. |
| 121 C. (250 F.) | 7 min. |
| 149 C. (300 F.) | 5 min." |

In a preferred embodiment of the invention, the two parts of Silastic J are mixed with Silastic J Curing Agent (catalyst marketed with Silastic J), molded onto the support member using a steel mold, and then vulcanized. Vulcanizing can be provided at room temperature, however, for a Silastic J RTV base cushion having a thickness of from 0.25–0.50 inches, it has been found convenient to initially heat the mold containing the support member and Silastic J RTV for a period of about one hour at 140° F. (60° C.). Vulcanizing at high temperatures for even moderate periods of time is highly undesirable, however, and presents a risk of equipment damage and injury. Silastic J and other silicone molding compounds expand greatly with temperature increases. Silastic J exploded a mold maintained at about 200° F. (93° C.) for a little more than 15 minutes.

After the mold containing the support member and its layer of silicone rubber is cooled, the mold is removed and a thermally conducting layer of thermally conductive, i.e., heat dissipating, silicone rubber is applied. In a preferred embodiment of the invention, the thermally conducting layer is a silicone elastomer marketed by Emerson & Cuming Division of Grace Specialty Polymer of Canton, Mass. as EC-4952. This silicone elastomer is a condensation cured organotin catalyzed polydimethylsiloxane elastomer that is heavily loaded with aluminum oxide and iron oxide.

EC-4952 exhibits high thermal conductivity and high thermal stability.

In other preferred embodiments of the invention, the thermally conducting layer is selected from materials disclosed in U.S. patent application Ser. No. 07/987,919 (now U.S. Pat. No. 5,292,606) entitled FUSER ROLL FOR FIXING TONER TO A SUBSTRATE; U.S. patent application Ser. No. 07/984,059 entitled FUSER ROLL FOR FIXING TONER TO A SUBSTRATE; U.S. patent application Ser. No. 07/984,077 (now U.S. Pat. No. 5,269,740) entitled FUSER ROLL FOR FIXING TONER TO A SUBSTRATE; and U.S. patent application Ser. No. 07/984,072 (now U.S. Pat. No. 5,292,562) entitled FUSER ROLL FOR FIXING TONER TO A SUBSTRATE; all filed Nov. 30, 1992, the specifications of which are hereby incorporated by reference.

The thickness of the thermally conducting layer can be varied to suit a particular use, however, a useful thickness is from 0.001 inches to 0.100 inches. The use of relatively thin layer minimizes the effects of swelling resulting from silicone oil or the like. A preferred thickness for a EC-4952 layer over a Silastic J RTV base cushion is from about 0.020 inches to about 0.030 inches. In a preferred embodiment of the invention, the thermally conducting layer is applied in two stages. In the first stage a primary thermally conducting layer of EC-4952, with a thickness of about 0.020 inches is applied over the base coat and then a secondary thermally conducting layer of EC-4952, with a thickness of from 0.001 to 0.010 inches is applied over the primary thermally conducting layer. The primary thermally conducting can be ground for size and to reduce surface roughness prior to application of the secondary thermally conducting layer.

A thin layer of oil and heat resistant silicone rubber may be applied over the thermally conducting layer, if desired.

In the method of the invention, the fusing member precursor, that is, the uncompleted fusing member including the supporting member and the base cushion, is baked at a temperature which would have vulcanized the base cushion in a very short time period, 5 minutes or less. The baking, at a temperature from about 150° C. (300° F.) to about 230° C. (450° F.), is maintained for a total time from 18 hours to 36 hours. Surprisingly, the conversion coating and baking steps act synergistically to improve the adherence of the base cushion to the support member in comparison to either procedure taken alone.

It is convenient to provide the baking step after application of the thermally conducting layer. The same results in terms of adherence of the base cushion to the support member are expected, whether the baking step is before or after the application of the thermally conducting layer.

If primary and secondary layers of EC-4952 are applied, it is desirable to divide the baking and bake after the application of the primary thermally conducting layer for from 18 to 24 hours at a temperature from about 150° C. (300° F.) to about 220° C. (425° F.) and bake after the application of the secondary thermally conducting layer for from 21 to 24 hours at a temperature from about 210° C. (410° F.) to about 230° C. (450° F.). The primary and secondary thermally conducting layers are thus baked for different total times and the baking temperature is either ramped upward or maintained about the same during the two portions of the baking step.

Referring now to the FIGURE, a fusing apparatus 10 is illustrated which incorporates the fusing member 12 of the invention. Dimensions are exaggerated to emphasize the invention. Fusing apparatus 10 is usable in an electrostatographic machine such as a copier or printer. A toner image 14 is borne by a receiver 16, traveling in a direction indicated by arrow 18, through a nip 20 between inventive fusing roller 12 and pressure roller 22. Fusing roller 12 is externally heated by a heat roller 24, which includes a central heating element 26. Rotation of rollers 12, 22, and 24 is illustrated by arrows, 28, 30, and 32, respectively. Pressure roller 22 and heat roller 24 each have a core 34,36 covered by a cushion layer 38,40, all respectively. An oil applier or wicking device 42 adjoins fusing roller 12.

Fusing roller 12 has an aluminum alloy support member 44, which is covered by a conversion coating and primer coat, designated collectively 46. The conversion coat and optional primer layer are covered by base cushion 48. Overlying base cushion 48 is thermally conducting layer 50, which is divided into primary and secondary thermally conducting layers 52,54.

The following Examples and Comparative Examples are presented to further illustrate some preferred modes of practice of the method and apparatus of the invention. Unless otherwise indicated, all starting materials were commercially obtained. Results described in the Examples and Comparative Examples were assigned to the highest applicable rating as follows: no adherence—poor, more than 10 percent adhered—fair, more than 50 percent adhered—good, 100 percent adhered-excellent.

EXAMPLE 1

A core of 6061-T6 aluminum was prepared to size and washed with an aluminum alkaline detergent for about 5 minutes, rinsed with water twice and then immersed in a tank containing about 4% by volume Oakite ChromiCoat L25 in water at a temperature between 90° and 110° F. The core was then rinsed in water and dried. Contact with the core at this time was limited to cotton gloves and microfoam polymeric storage material. The core was then coated with Dow Corning 1200 Prime Coat diluted to 50% by volume with naptha. Dow Corning Silastic J RTV was mixed with catalyst and molded onto the core at room temperature to form the base cushion. The mold was then heated to 140° F. for one hour. The mold was cooled in a freezer and the molded product was ejected from the mold. The base cushion was then coated with a layer 0.020 inches thick of EC-4952 to form a primary thermally conducting layer. The resulting unfinished roller was then heated to 425° F. for 30 hours. The roller was then ground removing a portion of the primary thermally conducting layer and a layer of EC-4952 0.001 inch thick was applied to form a secondary thermally conducting layer. The unfinished roller was then heated to 425° F. for 24 hours.

The completed fusing roller was evaluated by cutting the thermally conducting layer and base cushion and examining for areas of non-adherence of the base cushion to the core. Adherence was found to be excellent. These procedures were repeated and the same results were seen.

EXAMPLE 2

The procedures of Example 1 were followed, and a fusing roller produced was used in an Eastman Kodak™ Model 2110 Duplicator electrostatographic copier. No delamination was detected during the production of 1,000,000 copies. These procedures were repeated and the same results were seen.

EXAMPLE 3

Fusing rollers were prepared in the same manner as in Example 1, except the chromate conversion coating was prepared as follows. An aqueous chromate conversion solution was prepared by mixing: $Na_2Cr_2O_7.H_2O$ (14 grams), KF (2.7 grams), $K_3Fe(CN)_6$ (10 grams), $HNO_3$ (48 Be')(6 ml) and distilled water was added to make 2 liters. The pH was adjusted to 1.9 with $HNO_3$. The core was first cleaned for 5–10 minutes using an alkaline detergent. The core was then rinsed in water and immersed in the chromate conversion solution for 2.5 minutes at room temperature. The core was then removed and dipped in a chrome treat solution containing between 160 and 640 parts per million of sodium metabisulfite to reduce $Cr^{6+}$ to $Cr^{3+}$ for the purpose of reducing waste treatment. The core was then rinsed and dried using warm air. Baking times varied from Example 1. After the primary thermally conducting layer was applied, the unfinished roller was heated to 338° F. for 10 hours. After the secondary thermally conducting layer was applied, the unfinished roller was baked at 425° F. for 18 hours. These procedures were repeated for 2 fusing rollers. The completed fusing rollers were evaluated as in Example 1 and results are presented in Table 2.

EXAMPLE 4

The procedures of Example 3 were repeated with the exception that a chromate/phosphate conversion solution was used which was prepared by mixing: $H_3PO_4$ (85% conc.) (89 ml), KF (13.8 grams), $CrO_3$ (20 grams) and distilled water to make 2 liters. The pH was adjusted to 1.9 with NaOH. The core was immersed for 4 minutes at a temperature of 115° F. The completed fusing roller was evaluated as in Example 1 and results are presented in Table 2.

COMPARATIVE EXAMPLE 1

The procedures of Example 1 were followed to produce two rollers, except no conversion coating was used. The rollers were evaluated as in Example 1 and were rated poor.

COMPARATIVE EXAMPLE 2

The procedures of Example 1 were followed except no primer was used. The roller was evaluated as in Example 1 and were rated poor.

COMPARATIVE EXAMPLE 3

The procedures of Example 1 were followed to produce two rollers, except no baking steps were used. The rollers were evaluated as in Example 1 and were rated poor.

COMPARATIVE EXAMPLE 4

The procedures of Example 4 were followed to produce two rollers, except the baking steps were deleted. The rollers were evaluated as in Example 1 and results are presented in Table 2.

TABLE 2

| Example or Comparative Example | Coating | Baking step | Adherence |
|---|---|---|---|
| Example 3 | chromate | yes | fair to good |
| Example 4 | chromate/ phosphate | yes | excellent |
| Comparative Example 4 | chromate/ phosphate | no | fair to good |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing a fusing member comprising the steps of conversion coating a metallic support member; priming said conversion coating; applying a base cushion of thermally insulating silicone elastomer over said primed conversion coating; vulcanizing said base cushion; applying a thermally conducting elastomer over said base cushion: and baking said support member and said base cushion at a temperature from about 150° C. to about 230° C. for at least 18 hours.

2. The method of claim 1 wherein said support member is aluminum alloy and said base cushion is silicone elastomer molding compound.

3. The method of claim 1 wherein said base cushion is cross-linked by said vulcanizing via an addition reaction between vinyl and hydride functionalities.

4. The method of claim 1 wherein said baking is further characterized as maintaining said support member and said base cushion at a temperature from about 150° C. to about 220° C. for from 18 to 36 hours.

5. A method for preparing a fusing member comprising, in order, the steps of chromate conversion coating an aluminum alloy core; priming said conversion coating; molding a base cushion of thermally insulating silicone elastomer molding compound over said conversion coating; vulcanizing said base cushion; applying a layer of thermally conductive elastomer over said base cushion; and baking said elastomer covered core at a temperature from about 150° C. to about 230° C. for at least 18 hours.

6. The method of claim 5 wherein said base cushion is cross-linked by said vulcanizing via an addition reaction between vinyl and hydride functionalities.

7. The method of claim 5 wherein said priming step is further characterized as applying metal alkoxide as primer.

8. The method of claim 5 wherein said applying and baking steps are further characterized as applying a primary layer of thermally conductive silicone elastomer over said base cushion, baking said elastomer covered core at a temperature from about 150° C. to about 220° C. for from about 18 hours to about 24 hours, applying a secondary layer of thermally conductive silicone elastomer over said base cushion, and baking said elastomer covered core at a temperature from 210° C. to 230° C. for from 21 hours to 24 hours.

9. The method of claim 5 wherein said thermally conductive elastomer is polydimethylsiloxane elastomer and said core is aluminum alloy 6061.

10. A fusing member comprising, a support member of aluminum alloy, said support member having a conversion coating, a base cushion of thermally insulating silicone elastomer overlying said conversion coating, a thermally conductive elastomer layer overlying said base cushion, and a primer coat between said conversion coating and said base cushion.

11. The fusing member of claim 10 wherein said conversion coating is a chromate conversion coating and said base cushion is silicone elastomer molding compound.

12. The fusing member of claim 11 wherein said aluminum alloy is 6061.

13. The fusing member of claim 10 wherein said base cushion is a cross-linked product of an addition reaction between vinyl and hydride functionalities.

14. The fusing member of claim 10 further characterized as the product of baking said elastomer covered support member at a temperature from about 150° C. to about 230° C.

15. The fusing member of claim 10 wherein said thermally conductive elastomer layer is further characterized as a primary thermally conducting layer and a secondary thermally conducting layer and wherein said primary and secondary conducting layers are the products of baking for differing total times.

16. The fusing member of claim 10 wherein said conversion coating is a chromate-phosphate conversion coating and said base cushion is silicone elastomer molding compound.

17. A method for preparing a fusing member comprising the steps of conversion coating a metallic support member; priming said conversion coating; applying a base cushion of thermally insulating silicone elastomer over said primed conversion coating; vulcanizing said base cushion; baking said support member and said base cushion at a temperature from about 150° C. to about 230° C. for at least 18 hours; and applying a thermally conducting elastomer over said base cushion.

18. The method of claim 17 wherein said support member is aluminum alloy and said base cushion is silicone elastomer molding compound.

19. The method of claim 17 wherein said base cushion is cross-linked by said vulcanizing via an addition reaction between vinyl and hydride functionalities.

20. The method of claim 17 wherein said priming step is further characterized as applying metal alkoxide as primer.

* * * * *